June 28, 1932. G. L. ROSEBROOK 1,864,944
SERVICING APPARATUS FOR WHEELED VEHICLES
Filed July 2, 1928 3 Sheets-Sheet 2

INVENTOR.
GUY LYNN ROSEBROOK
BY
HIS ATTORNEY

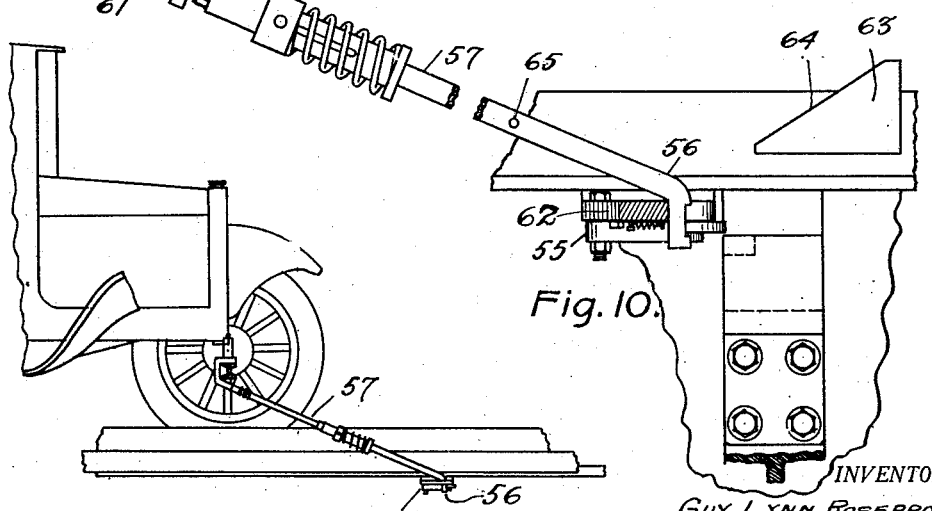

Patented June 28, 1932

1,864,944

UNITED STATES PATENT OFFICE

GUY LYNN ROSEBROOK, OF OAKLAND, CALIFORNIA, ASSIGNOR, BY DIRECT AND MESNE ASSIGNMENTS, TO STANDARD OIL DEVELOPMENT COMPANY, A CORPORATION OF DELAWARE

SERVICING APPARATUS FOR WHEELED VEHICLES

Application filed July 2, 1928. Serial No. 289,772.

The invention relates to apparatus for effecting washing, polishing, greasing, and other servicing operations on wheeled vehicles, and particularly on automobiles.

An object of the invention is to provide in apparatus having a series of stations at which different operations are arranged to be performed, an improved means for advancing an automobile from station to station which involves a minimum application of power.

Another object of the invention is to provide apparatus of the character described which is so arranged that a maximum number of operations may be effected in a minimum floor space, thereby permitting a minimum investment in real property and a housing structure.

A further object of the invention is to provide at the various stations means giving a maximum degree of access to the vehicle parts to be worked on.

A still further object of the invention is to provide apparatus so arranged as to permit a constant viewing by the public of a vehicle being serviced without interference with the mechanics working thereon.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to said drawings,

Figure 6 is a sectional view taken on the line 6—6 of Fig. 1, and particularly disclosing a conveyor operating means of the device.

Figure 7 is an end view of a link of a vehicle propelling chain of the apparatus mounted in a guideway and support therefor, the latter being shown in transverse section.

Figure 8 is a side view of the chain link shown in Figure 7.

Figure 9 is a view taken on the line 9—9 in Figure 7.

Figure 10 is a side view showing a drawbar engaged between the link shown in Figure 8 and the axle of a vehicle.

Figure 11 is a reduced view showing the draw-bar in use.

Figure 1:
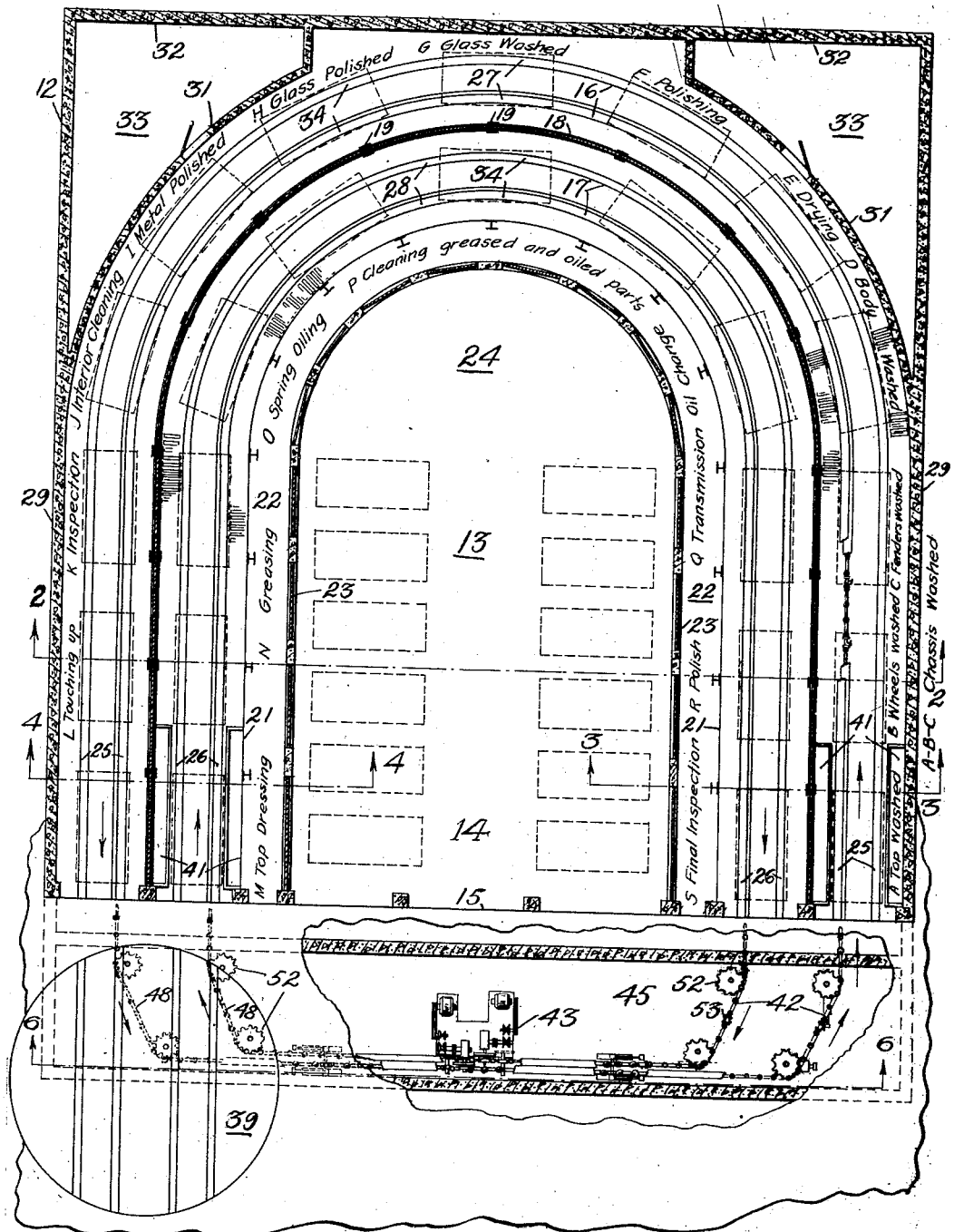
Figure 1 is a plan view of an installation of the apparatus, parts of the structure being broken away to disclose sub-floor portions thereof.
Figure 2:
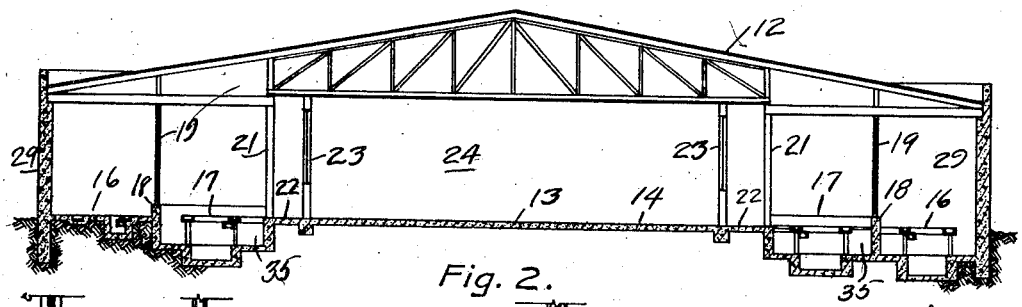
Figure 2 is an elevation of the apparatus and a building housing the same taken at the line 2—2 in Figure 1.
Figure 3:
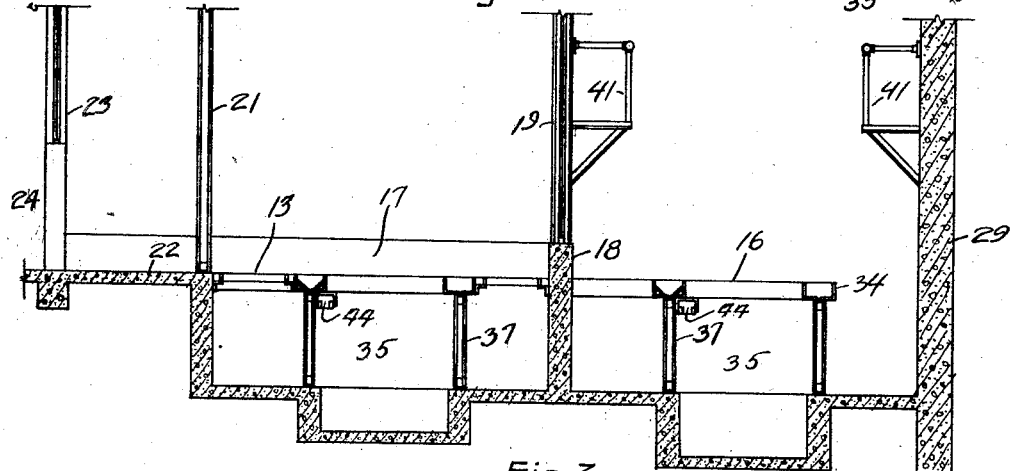
Figure 3 is an enlarged fragmentary view taken on the line 3—3 in Figure 1.
Figure 4:
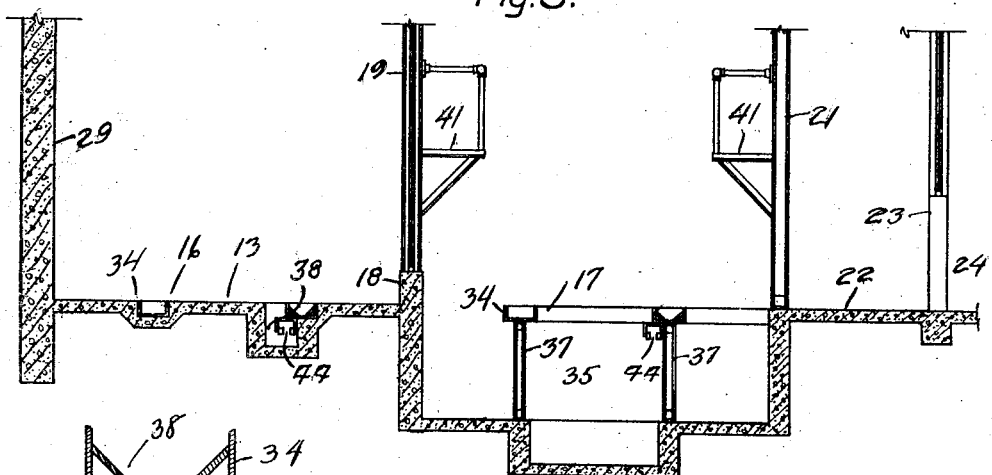
Figure 4 is an enlarged fragmentary view taken on the line 4—4 in Figure 1.
Figure 5:
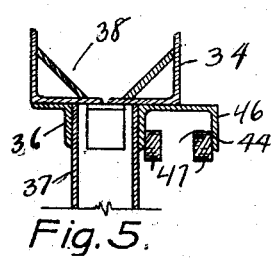
Figure 5 is an enlarged view of a portion of the showing of Figure 3.

Essentially, the servicing apparatus of the present invention comprises the provision of a fixed path along which wheeled vehicles are arranged to be moved while being serviced. At different points or stations along the path are found facilities for performing the different servicing operations. Means are provided for propelling the vehicle along the path between the stations at a relatively slow and constant speed, the lengths of the stations in terms of the work to be done thereat being such that the operations may be performed in continuous succession and the required space for the necessary equipment is provided at each station. In order to provide for performing the large number of servicing operations which are possible of performance with such a device, the path is necessarily of considerable length, which fact directly involves a consideration of the floor space required for the apparatus and the matter of roofing said space, since the value of the investment of an installation is an important factor, particularly in providing for the servicing of automobiles. Since compactness of the device is thus most desirable, a preferred method for accomplishing this result is to divide the path into two or more sections so arranged that when a car leaves one section it is in position to be immediately started on its movement through the next section, and it is to such an arrangement that the present invention particularly relates.

As herewith particularly disclosed, the apparatus of the invention is provided in a building 12 having a floor 13 providing a floor space 14 terminating at a front line 15 thereof, which line as here shown is coincident with the front line of the building and is straight, it being noted, however, that such is not essential. Path portions 16 and 17 are defined on the floor 13, said portions having both ends thereof terminating at the line 15. Preferably, and as shown, the path portions 16 and 17 extend in generally parallel adjacent relation to each other whereby adjacent ends thereof make equal angles with the line 15. The path portions 16 and 17 are of somewhat greater width than is an automobile whereby side clearance for working on an automobile is provided and the common line separating the path portions is defined by a partition 18 preferably having the larger portion thereof of glass and being supported by and between columns 19 of the building. The other edge of the inner path portion 17 is defined by a railing 21. Spaced from said railing to define therewith a path or walk 22, is a partition 23, said partition extending along the full length of the path 17 to terminate at the line 15 and enclosing a space 24 apart from the path spaces 16 and 17. The partition 23 is also preferably mainly of glass, it being noted that the walk 22 is primarily provided as a means whereby the public may view the work being done in the different parts of the structure.

It will now be noted that the shape of the path portions 16 and 17 is determined largely by the shape of the floor space 14 provided behind the line 15. In the present instance, this floor space is substantially square and the path portions 16 and 17 have straight front parts 25 and 26 extending substantially half of the depth of said floor space and connected by semi-circular parts 27 and 28 respectively. Preferably, and as shown, the parts 25 of the outer path portions 16 lie along the side walls 29 defining the floor space, while the generally triangular corner spaces defined between the curved part 27 of the path portion 16 are partitioned from said portion by means of partitions 31 following the curve of the path part 27 and cooperating with the side walls 29 and the rear wall 32 to define spaces 33 which are arranged to be used for storage or other purposes. In this manner the generally U-shaped path portions 16 and 17 are arranged to have a minimum of curvature.

Pairs of tracks 34 are provided for supporting and guiding a vehicle during its movement along the path portions 16 and 17. The tracks 34 extend centrally through the path portions and provide grooves for the reception of the automobile wheels whereby a vehicle may be steered to follow a path portion as it is moved therealong. Certain floor portions along the path portions 16 and 17 are lowered for the full widths of said portions to provide pits 35, and at such places the stringers 36 which support the tracks are in turn supported by posts or columns 37 extending from the bottom of the pits 35. The tracks, stringers and posts are preferably formed of steel sections whereby a pit space is occupied to a minimum extent. A trough 38 extends along the floor at an inner track of each pair and between the pair of tracks at all parts of the path sections which lack a pit, the purpose of this latter structure being hereinafter brought out.

Disposed in front of the line 15 opposite a pair of corresponding ends of the path portions 16 and 17 is a turn table 39 of any suitable structure and preferably having its axis of rotation midway between the lines of said path portions whereby an automobile placed thereon by being run thereonto from one path portion will, when the turn table is rotated through an angle of one hundred eighty degrees, be aligned with the other path portion for movement thereto. In this manner, an automobile leaving either one of the path portions at the turntable may be directed back into the other in an extremely simple manner.

It will now be noted that various stations are provided along the path portions at which different servicing operations are arranged to be performed. These stations are coterminous and may overlap where the servicing operations to be performed do not interfere. As shown, the stations along the outer path portion 16 relate chiefly to the cleaning operations, while the stations along the inner path portion include the greasing and oil changing operations. The exact order and positioning of the stations is desirably one by which the entire servicing process may be performed most efficiently, a typical arrangement being indicated in Figure 1. At those stations where the top is to be worked on, balconies 41 are provided. Means are provided at the various stations for facilitating the work to be done thereat, such means not, however, being shown, it being noted that such means would include hose connections for hot and cold water and compressed air at the appropriate stations. As shown, stations A, B, . . . S are indicated, the operations thereat being substantially as follows.

| | |
|---|---|
| A | Top washed |
| B | Wheels washed |
| C | Fenders washed |
| A—B—C | Chassis washed |
| D | Body washed |
| E | Drying |
| F | Polishing |
| G | Glass washed |
| H | Glass polished |
| I | Metal polished |
| J | Interior cleaning |
| K | Inspection |
| L | Touching up |
| M | Top dressing |
| N | Greasing |
| O | Spring oiling |
| P | Cleaning greased and oiled parts |
| Q | Transmission oil change |
| R | Polish |
| S | Final inspection |

With reference to the particular stations disclosed, it is noted that the balconies 41 are located at stations A and M; that hot and cold water and cleansing fluids would be provided at stations A, B, C, D and G; that compressed air would be available at station E as a drying means; that a vacuum cleaner would be provided at station J for the interior cleaning; and that greases and oils, and applying devices therefor, would be found at stations N and O and Q. It will be clear that the foregoing is not a complete list of the facilities to be provided but is merely intended as indicative of their nature.

It will now be noted that the most efficient use of the structure and apparatus described will be effected if all of the automobiles being serviced at one time are caused to advance at the same rate, said rate being such as will give sufficient time for the completion of each servicing operation at its station. Means are accordingly provided for effecting such control of the movement of the automobiles through the use of endless chains 42 propelled by suitable mechanism 43 at a constant speed. The chains are supported in guideways 44 provided along and adjacent the innermost tracks 34, said guideways being mounted on the posts 37 and on a side of the trough 38 whereby they extend continuously through the pits 35 and troughs 38. Preferably a V shaped channel is provided within the inner guide ways 34 whereby the wheels on the vehicle to be serviced may at all times be centrally retained in the tracks and rubbing between the sides of the wheels and tracks thus effectively prevented. As shown, the mechanism 43 is disposed in a cellar or pit 45 provided below the floor plane and generally in front of the line 15, and separate chains are provided for the different path portions to run in opposite directions.

The guideways 44, it is noted, comprise inverted channels 46 having opposed track strips 47 secured at the lower edges of their flanges. The links 48 of the chain are formed with spaced side members 49 connected by pins 51 whereby the chain may engage and be supported by sprocket wheels 52 which in part carry the chain at certain points thereof forwardly of the line 15. Fixed to certain of the links 48 are carriages 53, each carriage being provided with wheels 54 engaging the top edges of the track strips 47 for supporting the carriage and link on these strips. Rollers 50 are provided on certain of the link pins 51, preferably those at the ends of the links having the carriages 53, whereby an anti-friction contact is provided between the links and the inner track strips. It is noted that the chain 42 operates in a horizontal plane and that the pins 51 thereof are vertical.

Extending laterally from the lower side of each carriage 53 to a point outwardly of the track 34 is a catch device 55 for engagement with one end 56 of a draw-bar 57. The other end of the bar 57 is provided with a hook portion 58 for engagement over an axle 59 of an automobile to be towed by the chain, said bar, when operatively disposed, being oblique to the horizontal, as is particularly shown in Figures 10 and 11. Detent means are preferably provided for releasably retaining the draw bar in engagement with the axle 59 and catch 55 when the bar is operatively disposed. A spring pressed member 61 is here shown mounted on the draw bar 57 adjacent the hook 58 thereof for cooperation with the hook to grip the axle, while a detent means 62 for the other end of the draw bar is provided as part of the catch 55. These detents, it is noted, are arranged to be rendered inoperative by and upon an upward displacement of the draw bar, yet maintain their operativeness as long as the bar is operatively disposed. Preferably and as shown, the bar 57 is formed with resiliently connected sections whereby shocks of sudden pulls may be absorbed.

Means are provided for effecting an automatic release of a bar 57 from a carriage 53 when the exit end of a path portion is reached, and as shown, such means comprises a plate member 63 mounted on the track adjacent the chain and providing an inclined edge 64 for engagement with a pin 65 protruding into the plane of the plate 63 from the bar 57. As the bar reaches such plate, it is thus arranged to be pivotally swung upwardly from its operative contact with the chain carriage and so be released therefrom. A further manual lifting of the bar about the axle releases the hook and the bar drops from the axle.

It will be noted that the vehicle propelling device now set forth is described in greater detail in my copending application for Letters Patent, Serial No. 291,708, filed July 11, 1928.

In using the apparatus, the automobile would first be disposed at the station A, and while positioned thereat would be attached to the chain 42 by means of a draw bar 57. In effecting such an attachment, the bar would first be hooked to the axle of the automobile and the carriage engaging end thereof swung downwardly into the path of movement of the carriages 53 for engagement with a carriage. Having been thus attached to the chain, the automobile would then be moved forwardly around the path portion 16 while the various servicing operations provided for along said path portion are effected. When the automobile reaches the other end of the path portion 16, a bar release member 63 would operate against the draw bar 57 to disengage the same from the chain.

If the further and completing servicing provided along the path portion 17 is desired, the automobile would be pushed or otherwise propelled onto the turntable 39 which would be rotated to dispose the automobile for direct entry to the first station M of the path portion 17, to which it would then be pushed or otherwise propelled. When the automobile reaches the station M it is attached to the inner chain 42 for propulsion around the path portion 17 and so to the station S where it is automatically released from the chain and is ready for delivery.

The speed of motion of the inner chain may be the same or greater than that of the outer chain, but may not be less if the apparatus is to be used most efficiently. The rate of motion of an automobile through the apparatus may be such that it takes but thirty minutes for the automobile to pass therethrough for the complete servicing provided. The central floor space 24, it is noted, is utilized for maintenance operations such as tire changing and repairs, brake adjusting and relining, wheel aligning, ignition, valve adjustment and replacement and body and fender repairs. And it will also be noted that automobiles passing through the apparatus are in no way supported by the chain which propels them and are moved only against the resistance of their own anti-friction bearings and their inertia, whereby a minimum of power is necessary for maintaining the motion of the chains.

I claim:

1. In apparatus of the class described, means defining generally U-shaped path portions having servicing stations therealong, said path portions lying along each other in immediately adjacent relation.

2. In apparatus of the class described, means defining a path having generally U-shaped portions each provided with servicing stations therealong, said path portions terminating at a common line and one portion lying entirely within the area defined by the other.

3. In apparatus of the class described, means defining generally U-shaped path portions having servicing stations therealong, one of said path portions lying entirely within the other, and track means in said path portions for supporting and guiding a wheeled vehicle for movement therealong.

4. In apparatus of the class described, means defining path portions lying along each other in immediately adjacent relation and having servicing stations therealong, means for supporting and guiding a wheeled vehicle along said path portions, and propulsion means operative independently of said first means and vehicle for propelling said vehicle in opposite directions along the different track portions.

5. In apparatus of the class described, means defining generally U-shaped path portions having servicing stations therealong, said path portions lying along each other in immediately adjacent relation and terminating at a common line transversely related thereto.

6. In apparatus of the class described, means defining generally U-shaped path portions having vehicle servicing stations therealong, said path portions lying along each other in laterally adjacent relation, and a turntable for transferring a vehicle from one path portion to the other.

7. In apparatus of the class described, means defining generally U-shaped path portions having vehicle servicing stations provided therealong, ends of said path portions being laterally adjacent and terminating at a common line, and a turntable for transferring a vehicle from one path portion to the other, said turntable being disposed beyond said path portion ends.

8. In apparatus of the class described, means defining curved path portions lying along each other in adjacent relation and having vehicle servicing stations therealong, means for supporting and guiding a wheeled vehicle along said path portions, a propulsion chain extending along each of said path portions and having the links thereof arranged for relative angular movement about vertical axes, the chains of adjacent path portions moving in opposite directions, and means for releasably connecting said chains with vehicles at different points along the chains.

9. In apparatus of the class described, means defining curved path portions lying along each other in adjacent relation, means for supporting and guiding a wheeled vehicle along said path portions, a constantly operating propulsion chain extending along each of said path portions, the chains of adjacent path portions moving in opposite directions, a draw bar for connecting the chain with a vehicle, and means automatically operable at the end of a path portion to effect a release of said bar from the chain engaged thereby.

10. In apparatus of the class described, means defining curved path portions lying along each other in adjacent relation and having ends thereof terminating at a common line, means for supporting and guiding a wheeled vehicle along said path portions, a constantly operating propulsion chain extending along each of said path portions, the chains of adjacent path portions moving in opposite directions, a draw bar for connecting the chain with the vehicle, means automatically operable at the end of a path portion over which the vehicle moves toward said line to release said bar from the chain engaged thereby, and a turntable at the end of said last path portion for disposing the vehicle for direct entry upon the other path portion.

11. In servicing apparatus for vehicles, a structure defining a plurality of vehicle pathways lying one within the other, and having servicing stations therealong, each of said pathways having its ends terminating at a common line.

12. In servicing apparatus for vehicles, a structure defining a vehicle pathway and a servicing pit beneath said pathway, said pathway having its ends terminating at a common line.

13. In servicing apparatus for wheeled vehicles, a structure provided with a pathway along which vehicles are movable, and service stations arranged to permit of servicing vehicles from above and beneath the pathway while vehicles are moved therealong, said pathway having its ends terminating at a substantially common point on said structure, and means for moving vehicles along said pathway.

14. In servicing apparatus for wheeled vehicles, a structure defining vehicle pathways and servicing stations therealong, each of said pathways having its ends disposed at a common line on said structure, one pathway lying entirely within the area defined by another of said pathways.

In testimony whereof, I have hereunto set my hand at Oakland, California, this 18th day of June, 1928.

GUY LYNN ROSEBROOK.